United States Patent
Bates et al.

(10) Patent No.: US 10,114,730 B2
(45) Date of Patent: *Oct. 30, 2018

(54) DYNAMIC INSTRUMENTATION BASED ON DETECTED ERRORS

(71) Applicant: International Business Machines Corporation, Armonk, NY (US)

(72) Inventors: Cary L. Bates, Rochester, MN (US); John D. Rotramel, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/183,000

(22) Filed: Jun. 15, 2016

(65) Prior Publication Data
US 2017/0102990 A1    Apr. 13, 2017

Related U.S. Application Data

(63) Continuation of application No. 14/881,463, filed on Oct. 13, 2015.

(51) Int. Cl.
*G06F 11/00* (2006.01)
*G06F 11/36* (2006.01)
(Continued)

(52) U.S. Cl.
CPC ........ *G06F 11/3644* (2013.01); *G06F 11/073* (2013.01); *G06F 11/079* (2013.01);
(Continued)

(58) Field of Classification Search
CPC ...... G06F 11/079; G06F 11/073; G06F 11/07; G06F 11/0703; G06F 11/0736;
(Continued)

(56) References Cited

U.S. PATENT DOCUMENTS

| | | | | |
|---|---|---|---|---|
| 5,581,696 A | * | 12/1996 | Kolawa | G06F 11/3624 714/38.1 |
| 2004/0060043 A1 | * | 3/2004 | Frysinger | G06F 11/3409 717/158 |

(Continued)

FOREIGN PATENT DOCUMENTS

WO    2009095741 A1    8/2009

OTHER PUBLICATIONS

Kessler, "Fast Breakpoints: Design and Implementation", pp. 78-84, Proceedings of the ACM SIGPLAN'90, Conference on Programming Language Design and Implementation, White Plains, New York, Jun. 20-22, 1990, Copyright 1990, ACM 0-89791-364-7/90/0006/0078.

Ortiz, "On Self-Modifying Code and the Space Shuttle OS", provided in Disclosure dated May 1, 2014, pp. 1-5, <http://weblog.cenriqueortiz.com/computing/2007/08/18/on-self-modifying-code-and-the-space-shuttle-os/>.

"Appendix P: List of IBM Patents or Patent Applications Treated as Related", Dated Jun. 15, 2016, pp. 1-2.

(Continued)

*Primary Examiner* — Bryce P Bonzo
*Assistant Examiner* — Anthony J Amoroso
(74) *Attorney, Agent, or Firm* — Edward J. Wixted, III

(57) ABSTRACT

In an approach for dynamically instrumenting a program at runtime, a processor identifies a sequence of memory related operations from an instruction stream, wherein the sequence includes at least a first memory related operation and a second memory related operation. A processor instruments the first memory related operation. A processor detects an error at the first memory related operation based on the instrumentation of the first memory related operation. A processor, responsive to detecting the error at the first memory related operation, instruments at least the second memory related operation.

8 Claims, 6 Drawing Sheets

(51) Int. Cl.
*G06F 11/07* (2006.01)
*G06F 11/34* (2006.01)

(52) U.S. Cl.
CPC ...... *G06F 11/0751* (2013.01); *G06F 11/0793* (2013.01); *G06F 11/3466* (2013.01)

(58) Field of Classification Search
CPC ............. G06F 11/0751; G06F 11/1048; G06F 11/1052; G06F 11/1064; G06F 11/1068; G06F 11/1072; G06F 11/302; G06F 11/3024; G06F 11/3037
See application file for complete search history.

(56) References Cited

U.S. PATENT DOCUMENTS

| | | | |
|---|---|---|---|
| 2010/0146220 A1* | 6/2010 | Panchenko | G06F 11/3471 711/154 |
| 2013/0247009 A1* | 9/2013 | Bradbury | G06F 9/3005 717/130 |
| 2016/0217029 A1* | 7/2016 | Yoon | G06F 21/52 |

OTHER PUBLICATIONS

U.S. Appl. No. 14/881,463, filed Oct. 13, 2015; Entitled "Dynamic Instrumentation Based on Detected Errors".

* cited by examiner

```
                                              ⤳ 400
  .
  .
  .
15000  lod  r1, 12345
15004  add  r1, #2
15008  str  r1, 54325
1500c  lod  r1, 12345
15010  lod  r3, 54325
15014  add  r1, r3
15018  str  r1, 54325
1501c  lod  r1, 12345
15020  lod  r3, 54325
15024  add  r1, r3
15028  add  r1, #4
1502c  str  r1, 54325
  .
  .
  .
```

FIG. 4

```
510 — 15000  ba   25000
      15004  add  r1, #2
      15008  ba   25020
      1500c  lod  r1, 12345
      15010  ba   25080
      15014  add  r1, r3
      15018  str  r1, 54325
      1501c  lod  r1, 12345
      15020  ba   25104
      15024  add  r1, r3
      15028  add  r1, #4
      1502c  str  r1, 54325
```

500

```
      25000 <Instrumentation code>
      <If error detected here add:
      ba 25040 @ 1500c
520 — ba 25100 @ 1501c
      >
      lod r1, 12345
      ba 15004
      25020 <Instrumentation code>
      <If error detected here add:
      ba 250c0 @ 15018
      ba 25108 @ 1502c
      >
      str r1, 54325
      ba 1500c
      25040 <Instrumentation code>
      lod r1, 12345
      ba 15010
      25080 <Instrumentation code>
      lod r3, 54325
      ba 15014
      250c0 <Instrumentation code>
      str r1, 54325
      ba 1501c
      25100 <Instrumentation code>
      lod r1, 12345
      25104 <Instrumentation code>
      lod r3, 54325
      ba 15024
      25108 <Instrumentation code>
      str r1, 54325
      ba ..
```

FIG. 5

DYNAMIC INSTRUMENTATION BASED ON DETECTED ERRORS

BACKGROUND

The present invention relates generally to the field of instrumentation, and more particularly to dynamically instrumenting object code based on errors detected at runtime.

Instrumentation refers to an ability to monitor or measure the level of a product's performance, to diagnose errors and to write trace information. Instrumentation may be implemented in the form of code instructions that monitor specific components in a system, for example, instructions may output logging information to appear on screen.

Dynamic verification is a process by which a program discovers errors that occur when a program runs. Static verification, or static code analysis, by contrast, involves detecting errors in the source code without ever compiling or running it, but rather, by just discovering logical inconsistencies. Dynamic verification is done at runtime.

Reduced instruction set computing (RISC) is a central processing unit (CPU) design strategy based on the insight that a simplified instruction set, as opposed to a complex set, provides higher performance when combined with a microprocessor architecture capable of executing those instructions using fewer microprocessor cycles per instruction. Typically, RISC processors use a small, highly optimized set of instructions, rather than a more versatile set of instructions often found in other types of architectures. RISC processors typically have a uniform instruction format, or fixed length instructions, and may have long range unconditional branches.

SUMMARY

Aspects of an embodiment of the present invention disclose an approach for dynamically instrumenting a program at runtime. A processor identifies a sequence of memory related operations from an instruction stream, wherein the sequence includes at least a first memory related operation and a second memory related operation. A processor instruments the first memory related operation. A processor detects an error at the first memory related operation based on the instrumentation of the first memory related operation. A processor, responsive to detecting the error at the first memory related operation, instruments at least the second memory related operation.

BRIEF DESCRIPTION OF THE DRAWINGS

FIG. 4 depicts a sample assembly language source code representation of a sample object code prior to instrumentation by a dynamic insertion function, in accordance with one embodiment of the present invention.

FIG. 5 depicts the sample assembly language source code representation of the sample object code subsequent to instrumentation by a dynamic insertion function, in accordance with one embodiment of the present invention.

DETAILED DESCRIPTION

Embodiments of the present invention recognize that instrumenting a program can cause the program to run slower once instrumented. Embodiments of the present invention describe an approach for increasing the efficiency of instrumentation through the use of dependent dynamic hooks. Embodiments of the present invention describe an approach to instrument an instruction by overlaying the instruction with a branch to a section of code inserted at the end of the executable. This section, herein referred to as a "tailer," runs the instrumentation code, executes the instrumented instruction, and branches back to the next instruction subsequent to original overlaid instruction. Embodiments of the present invention recognize that such an approach may reduce run-time overhead. In some current approaches, generated code is unoptimized and often contains sequences where the same value is loaded from the same address in memory repeatedly. Current approaches instrument each of these loads. Embodiments of the present invention recognize that if the instrumentation for the first load finds no error, subsequent loads of the same unchanged pointer/value pair should also not have any errors to report, and thus, these loads need not be instrumented unless the instrumentation for the first load finds an error. Embodiments of the present invention recognize that decreasing the number of instrumentation hooks may allow the instrumented program to run faster.

The present invention will now be described in detail with reference to the Figures.

Figure 1:
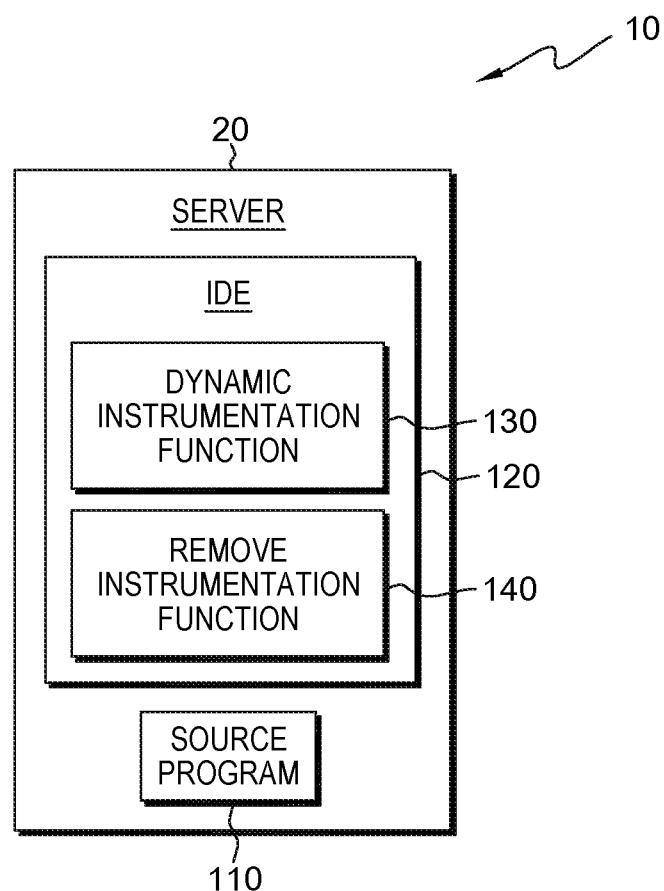
FIG. 1 depicts a diagram of a computing environment, in accordance with one embodiment of the present invention.

FIG. 1 depicts a diagram of computing environment 10, in accordance with one embodiment of the present invention. FIG. 1 provides only an illustration of one embodiment and does not imply any limitations with regard to the environments in which different embodiments may be implemented.

In the depicted embodiment, computing environment 10 includes server 20. Computing environment 10 may also include a network, servers, computing devices, or other devices not shown.

Server 20 may be a management server, a web server, or any other electronic device or computing system capable of processing program instructions and receiving and sending data. In some embodiments, server 20 may be a laptop computer, tablet computer, netbook computer, personal computer (PC), a desktop computer, or any programmable electronic device. In other embodiments, server 20 may represent a server computing system utilizing multiple computers as a server system, such as in a cloud computing environment. In another embodiment, server 20 represents a computing system utilizing clustered computers and components to act as a single pool of seamless resources. Server 20 contains source program 110, integrated development environment (IDE) 120, dynamic instrumentation function 130, and remove instrumentation function 140. Server 20 may include components, as depicted and described in further detail with respect to FIG. 6.

Source program 110 is a generic program that includes source code to be converted to object code by a compiler (not shown) of IDE 120. Embodiments of source program 110 may be written in a variety of programming languages. In some embodiments, source program 110 resides on server 20. In other embodiments, source program 110 may reside on another server or another computing device, provided that source program 110 is accessible to IDE 120, dynamic instrumentation function 130, and/or remove instrumentation function 140.

IDE 120 is a software application that provides comprehensive facilities to computer programmers for software development. IDE 120 may contain a source code editor, built automation tools, and debuggers. In some embodiments, IDE 120 contains a compiler and/or interpreter. In some embodiments, IDE 120 contains a class browser, an object browser, and a class hierarchy diagram, for use in object-oriented software development. In one embodiment, IDE 120 includes dynamic instrumentation function 130 and/or remove instrumentation function 140. In one embodiment, IDE 120 resides on server 20. In another embodiment, IDE 120 may reside on another server or another computing device, provided that IDE 120 has access to source program 110.

Dynamic instrumentation function 130 may be, for example, a runtime error analysis tool. Dynamic instrumentation function 130 operates to identify sequences of memory related operations (e.g., store, load), and instrument a first instance of such a sequence such that if an error is detected, at runtime, additional instrumentation hooks may be inserted for additional instances of memory related operations in the sequence. Hooking refers to a range of techniques used to alter or augment the behavior of an operating system, of applications, or of other software components by intercepting function calls or messages or events passed between software components. Code that handles such intercepted function calls, events, or messages, is called a hook. In some embodiments, dynamic instrumentation function 130 is utilized when a processor performing the memory related operation is a reduced instruction set computing (RISC) processor. In general, RISC processors have fixed length instructions and long range unconditional branches which allow dynamic instrumentation function 130 to instrument an instruction of object code by overlaying the instruction with a branch to a section of code inserted at the end of the executable (hereinafter referred to as a "tailer"). The tailer runs instrumentation code, executes the instrumented instruction, and branches back to the next instruction (i.e., the instruction subsequent to the overlaid instruction). In general, instrumentation refers to an ability to monitor or measure the level of performance, to diagnose errors, and to write trace information. In some embodiments, instrumentation code is utilized to discover errors such as, for example, array bounds reads and writes, trying to access unallocated memory, freeing unallocated memory (usually due to freeing the same memory for a second time), and memory leaks (i.e., allocated memory with no pointer reference). In some embodiments, dynamic instrumentation function 130 is a function of IDE 120. In other embodiments, dynamic instrumentation function 130 is a stand-alone program capable of operating as described above and in reference to FIG. 2.

Remove instrumentation function 140 operates to monitor the state of identified sequences of memory related operations, subsequent to an error being detected by dynamic instrumentation function 130, and determine whether the error remains present. If the error is no longer persisting, remove instrumentation function 140 operates to remove previously inserted hooks from additional instances of memory related operations of the sequence associated with the no longer persisting error. In some embodiments, remove instrumentation function 140 is only utilized in sections of object code determined to be "hot" (e.g., based on, for example, time between calls to the instrumentation hooks, loop-nest at instrumentation, etc.). In some embodiments, remove instrumentation function 140 is a function of IDE 120. In other embodiments, remove instrumentation function 140 is a stand-alone program, or function of dynamic instrumentation function 130, capable of operating as described above and in reference to FIG. 3.

Figure 2:
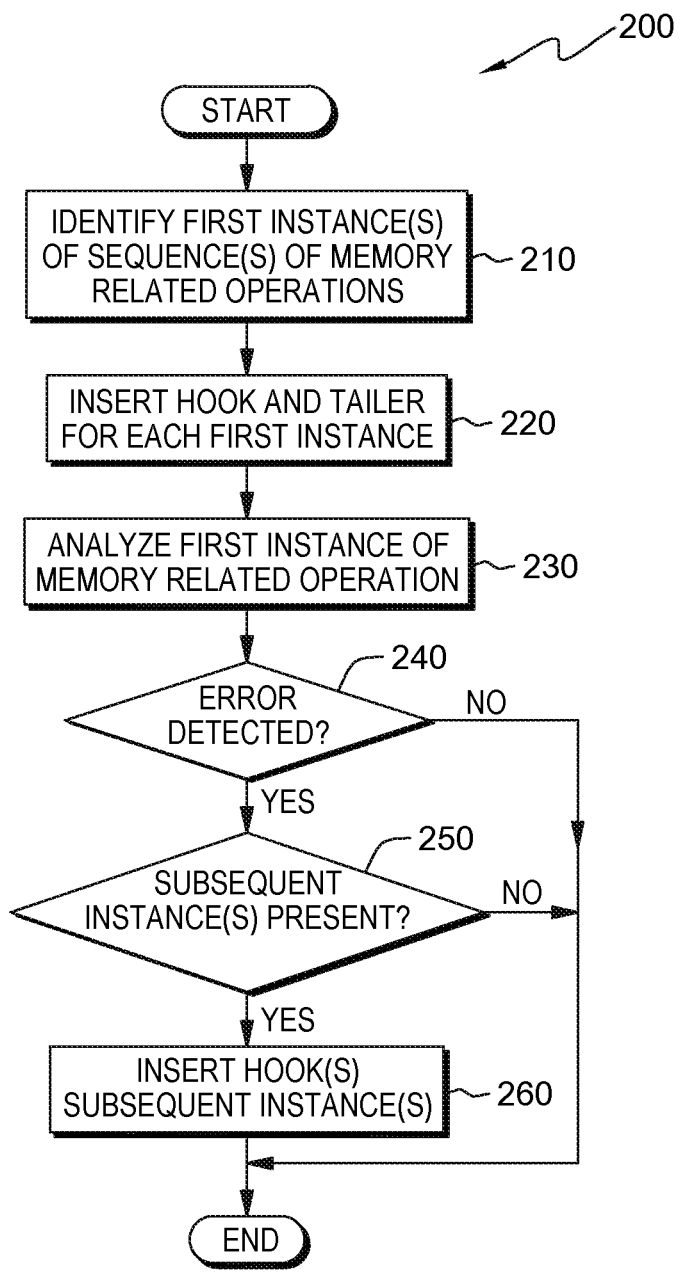
FIG. 2 depicts a flowchart of the steps of a dynamic insertion function executing within the computing environment of FIG. 1, for instrumenting object code based on errors detected at runtime, in accordance with one embodiment of the present invention.

FIG. 2 depicts a flowchart 200 of the steps of dynamic instrumentation function 130, a function of IDE 120, executing within computing environment 10 of FIG. 1, in accordance with an embodiment of the present invention. Dynamic instrumentation function 130 operates to insert hooks into subsequent memory operations of a sequence in response to identifying an error in a first instance of the sequence. Dynamic instrumentation function 130 operates at runtime with respect to object code.

In one embodiment, initially, a developer may write source code for source program 110. In some embodiments, a developer may write source code for source program 110 using IDE 120. During execution or compilation of source program 110, object code is generated and dynamic instrumentation function 130 may perform steps, as described below.

In step 210, dynamic instrumentation function 130 examines the instruction stream of the object code and identifies sequences where only the first memory related operation (e.g., load or store) in a sequence needs to be instrumented. For a load instruction, each sequence is a sequence of instructions that load from the same definition (e.g., address/value pair), such that no path reaches any of the load instructions without first passing through a first load of that definition. As used herein, a "first load" or "first store" is a load or store in the object code of source program 110 that has to be instrumented (see step 220). Loads of any new definition or value contained in the address will end the sequence. For example, a subsequent store to the address that was the source of a first load will end the sequence, such that the next load from that address will be considered a first load of a new sequence. In addition, any execution path that does not go through a first load of the definition will also end such a sequence, and the first load of the definition would become a new first load for a new sequence. If the type of address is unknown, or the address being loaded from is known to be within dynamic storage, dynamic instrumentation function 130 may identify that the sequence has ended, and the next load or store to such an address is considered a first load or first store.

In some embodiments, for load instructions, a modified reaching definitions algorithm may be used. In general, a reaching definitions algorithm specifies that each basic block of a control flow graph has an IN set, an OUT set, and a KILL set. A definition is created by storing a value to an address. Storing a value to an address also kills any previous definition for that address. When a current node (i.e., block of the control flow graph) is processed, the current node looks to all immediate predecessor nodes, and the union of all of the OUT sets of the predecessor nodes becomes the IN set for the current node. As the current node is processed, any stores that kill definitions result in such definitions being removed from the current node's OUT set. In some instances, additional definitions may be created, and such additional definitions may be added to the OUT set. After processing, the OUT set of the current node is accessible to other nodes as the reaching definitions algorithm iterates or loops. The reaching definitions algorithm continues to loop through all nodes in the control flow graph until an iteration occurs where none of the set changes, and then the reaching definitions computation is complete.

The modified reaching definitions algorithm used by some embodiments of the present invention makes a number of modifications to the reaching definitions algorithm. First, an attribute is associated and maintained with each definition that describes the loaded state of the definition (e.g., not loaded, first load, subsequent load, singular load). Second, each definition that has been identified by dynamic instrumentation function 130 as a first load will have a specified set for any subsequent loads that are a part of the respective sequence, as identified by dynamic instrumentation function 130. Third, the definition is implemented such that the definition comes through all predecessor nodes. Thus, the first load of a value from an address within a basic block is assumed to be a first load, and is the load that will be instrumented (see step 220). If there are additional loads of the same address within the same basic block, then each additional load will be flagged as a subsequent load and these additional loads are added to the set associated with the first load definition. Definitions are killed by the same means as described with respect to a standard reaching definitions algorithm. Additional, definitions may be killed if the address of the definition is of unknown origin or known to be a heap address, a call to free will kill the additional definitions. Similar to a standard reaching definitions algorithm, the modified reaching definitions algorithm runs until there is an iteration where no sets change. Based on this information, dynamic instrumentation function 130 is left with the first loads that are to be hooked, and all subsequent loads associated with each first load. In some embodiments, dynamic instrumentation function 130 cannot determine what the address is that is being loaded from, this will be considered a singular load, which is a first load with no associated subsequent loads.

For store sequences, dynamic instrumentation function 130 begins the sequence with a first store to an address and includes all stores to the same address that are reachable only if control runs through the first store instruction which stores to the address. A sequence of stores is ended if control reaches such a store instruction that did not pass through a first store for the address. A store sequence may also be ended when the address being stored to is of dynamic or unknown origins.

In some embodiments, a modified reaching definitions algorithm is used for store instruction sequences. In such an algorithm, "store" and "load" are each attributes. Rather than containing a definition, the In sets and Out sets each contain the address being stored to, along with the attribute flag and subsequent store set. While processing a basic block, when a first store is reached, the first store will only be flagged as a subsequent store if all preceding nodes of the control flow graph export a definition for a first store to that address. When this occurs, the store is added to the subsequent set for each first store that reaches the store, and if the store was flagged as a first node and had a subsequent set, all of those stores are also added to the subsequent sets of all first store definitions that reach. A store definition can be killed by a call, or possible call, to free, where the address being stored is known to be an address from heap or unknown origins.

It shall be noted that, in some example embodiments, one or more sequences may overlap and a subsequent load or store may exist in more than one sequence.

In step 220, dynamic instrumentation function 130 inserts a hook for each of the identified first instances of memory related operations (e.g., load/store operations). In one embodiment, the hook is implemented utilizing a branch instruction that replaces the respective memory related operation in the sequence of instructions. The branch instruction then directs computation to a tailer, which in some embodiments, is located at the end of the executable. The tailer specifies instrumentation code that is to be executed, and additional branch instructions, based on the identified sequence, that may be added to the sequence of instructions if the instrumentation code indicates that an error is present. The tailer further includes the original memory related operation instruction of the sequence of instructions, as well as a branch instruction to cause computation to return to the sequence of instructions. If the first memory related operation was a single memory related operation, and thus there was no sequence, the tailer merely includes the instrumentation code, original instruction, and branch back to the sequence of instructions. Additional tailers include instrumentation code, respective instructions for each subsequent memory related operation of a sequence, and a branch instruction to cause the computation to return to the sequence of instructions. However, based on the tailer of the first memory related operation, these tailers may only be accessed and utilized for computation in the event that an error is detected by the instrumentation code of the first memory related operation.

In step 230, dynamic instrumentation function 130, or the instrumentation code, analyzes a first instance of a memory related operation. In embodiments of the present invention, instrumentation code is utilized to discover errors such as, for example, array bounds reads and writes, trying to access unallocated memory, freeing unallocated memory (usually due to freeing the same memory for a second time), and memory leaks (i.e., allocated memory with no pointer reference).

In decision 240, dynamic instrumentation function 130 determines whether an error has been detected. In general, what may constitute an error could vary based on the utilized instrumentation code and desired application of dynamic instrumentation function 130. Dynamic instrumentation function 130 may determine whether an error has been detected based upon the analysis and instrumentation code (see step 230). If dynamic instrumentation function 130 detects no error (decision 240, no branch), the function is complete, or is at least complete until the next first load/store of a sequence is processed. If dynamic instrumentation function 130 detects an error (decision 240, yes branch), dynamic instrumentation function 130 determines whether there are additional instance(s) of memory related operations present in the sequence (see decision 250).

In decision 250, dynamic instrumentation function 130 determines whether additional instance(s) of memory related operations are present. Dynamic instrumentation function 130 may determine whether additional instance(s) of memory related operations are present based on the presence or absence of identified sequences, as described with reference to step 210. If dynamic instrumentation function 130 determines that no additional instances of memory related operations are present (decision 250, no branch), the function is complete, or is at least complete until the next first load/store of a sequence is processed. If dynamic instrumentation function 130 determines that additional instances of memory related operations are present (decision 250, yes branch), dynamic instrumentation function 130 causes hooks to be inserted for additional instance(s) of memory related operations of the sequence (see step 260).

In step 260, dynamic instrumentation function 130 causes hooks to be inserted for additional instances of memory related operations of the sequence. Such hooks may be implemented via object code insertion and, in some embodiments, may include replacing each additional instance of a memory related operation of the sequence with a branch instruction to a tailer that includes instrumentation code, the replaced instruction, and a branch back to the sequence of instructions. Such an embodiment is described with reference to step 220. Inserted hooks may cause further instrumentation code to occur for the additional instances of memory related operations of the sequence. However, if no error was detected (see decision 240, no branch), such hooks are not inserted, and thus, the additional instances of memory related operations of the sequence would process without instrumentation.

For multithreaded applications, there is a risk that memory may be freed by another thread. Embodiments of the present invention will give an error if we store to or load from freed storage (e.g., memory that may be freed by another thread). Dynamic instrumentation function 130 may determine if multiple threads are active in a process when the memory that is being loaded or stored is in heap, or is memory from another thread's stack, or is any other type of memory that may be freed up by another thread's behavior. If remove instruction determines multiple threads are active in a process, then dynamic instrumentation function 130 operates as if an error was detected (see decision 240), and hooks are inserted to subsequent loads/stores of the sequence. This allows dynamic instrumentation function 130 to detect if a subsequent read or write to or from unallocated storage is performed.

Many sequences of memory related operations may be discoverable by dynamic instrumentation function 130. As such, dynamic instrumentation function 130 may execute steps described in flowchart 200 any number of times.

An example of dynamic instrumentation function 130 utilizing branching and tailers to instrument object code is described with reference to FIG. 4 and FIG. 5.

Figure 3:
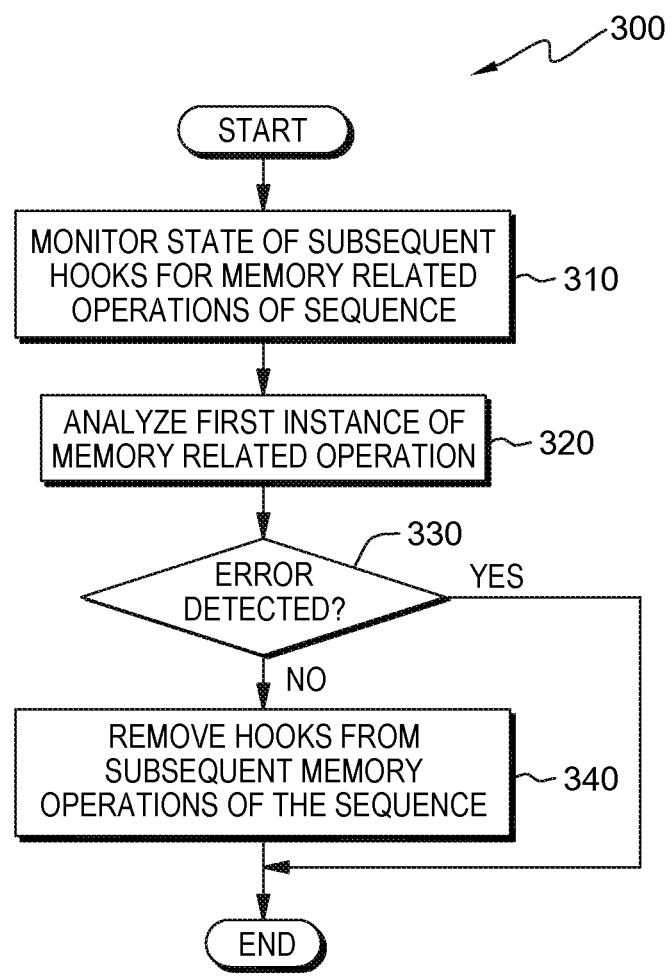
FIG. 3 depicts a flowchart of the steps of a remove instrumentation function executing within the computing environment of FIG. 1, for removing hooks from subsequent instances memory based on a no longer present error, in accordance with one embodiment of the present invention.

FIG. 3 depicts a flowchart of the steps of remove instrumentation function 140, a function of IDE 120, executing within computing environment 10 of FIG. 1, in accordance with an embodiment of the present invention. Remove instrumentation function 140 operates to remove previously inserted instrumentation with respect to subsequent loads or stores of a sequence based on an error that is no longer present, and may be optionally implemented in embodiments of the present invention. In some embodiments, remove instrumentation function 140 is only utilized in sections of object code determined to be "hot" (e.g., based on, for example, time between calls to the instrumentation hooks, loop-nest at instrumentation, etc.).

In one embodiment, initially, one or more errors were detected by dynamic instrumentation function 130 which resulted in additional hooks being added into the sequence of instructions. In some embodiments, these hooks may take the form of branch instructions that have replaced one or more load or store instructions within the sequence of instructions. It should be noted that, because such hooks only exist in the loaded or executing program (e.g., loaded or executing version of source program 110), even if such hooks are not removed, they will not be present within the source code of source program 110 on disk, or other memory location.

In step 310, remove instrumentation function 140, or the first load/store tailer for the respective memory related operation, keeps track of, or otherwise monitors, the state of subsequent memory related operation hooks of the sequence.

In step 320, remove instrumentation function 140 analyzes the first instance of a memory related operation, similarly to as described with respect to step 230 (see FIG. 2).

In decision 330, remove instrumentation function 140 determines whether an error is detected, similarly to as described with respect to decision 240. If remove instrumentation function 140 determines that an error is detected, and thus remains present (decision 330, yes branch), the function is complete, or is at least complete until an additional first load/store operation of a sequence is processed. In such a circumstance, remove instrumentation function 140 will cause the hooks to remain in subsequent memory related operations of the sequence. If remove instrumentation function 140 determines that no error is detected (decision 330, no branch), remove instrumentation function 140 removes hooks from subsequent memory related operations of the sequence (see step 340).

In step 340, remove instrumentation function 140 removes hooks from subsequent memory related operations of the sequence. In some embodiments, remove instrumentation function 140 removes hooks from subsequent memory related operations of the sequence by object code insertion to replace the branch with the original instruction of the sequence of instructions.

FIG. 4 and FIG. 5 depict an example use-case scenario of dynamic instrumentation function 130, in accordance with one embodiment of the present invention. In the depicted Figures, assembly language source code representation 400 (see FIG. 4) of object code is instrumented at runtime by dynamic instrumentation function 130, as represented by assembly language source code representation 500 (see FIG. 5) of object code.

FIG. 4 depicts assembly language source code representation 400 of object code for source program 110. Assembly language source code representation 400 may be any compiled source code that includes at least one sequence of memory related operators. In the depicted embodiment, assembly language source code representation 400 includes memory related operations as 15000, 15008, 1500c, 15010, 15018, 1501c, 15020, and 1502c. Assembly language source code representation 400 includes four separate sequences of memory related operations, as described previously, each sequence beginning at 15000 (subsequently including 1500c and 1501c), 15008 (subsequently including 15018 and 1502c), 15010, and 15020. 15000 includes a first instance of a load of r1 at 12345, a location in memory. 15008 includes a first instance of a store of r1 at 54325. 15010 includes a first instance of a load of r3 at 54325. Finally, 15020 is considered a new first load of a new sequence because subsequent to the previous load of r3 from 54325 at 15010, 15018 included a store of r1 at 54325. Thus, the sequence was broken and 15020 is a new first load of a new sequence.

FIG. 5 depicts assembly language source code representation 500 of object code for source program 110 subsequent to instrumentation by dynamic instrumentation function 130. As described in reference to the previous Figures, some embodiments of dynamic instrumentation function 130 operate to insert branch instructions to each first memory related operation of a sequence, such as a first load or first store. For example, dynamic instrumentation function 130 inserted branch instruction 510 at 15000 branching to 25000. At 25000 is what has been described herein as a tailer. Tailer 520 includes instrumentation code, as previously described, and additional code that causes additional branch instructions to replace specified instructions if dynamic instrumentation function 130 determines that an error is present. If dynamic instrumentation function 130 determines that no error is present, the additional branch instructions do not replace the specified instructions. Tailer 520 also includes the original instruction, prior to the insertion of branch instruction 510, and a branch instruction to the next instruction of the object code.

Figure 6:
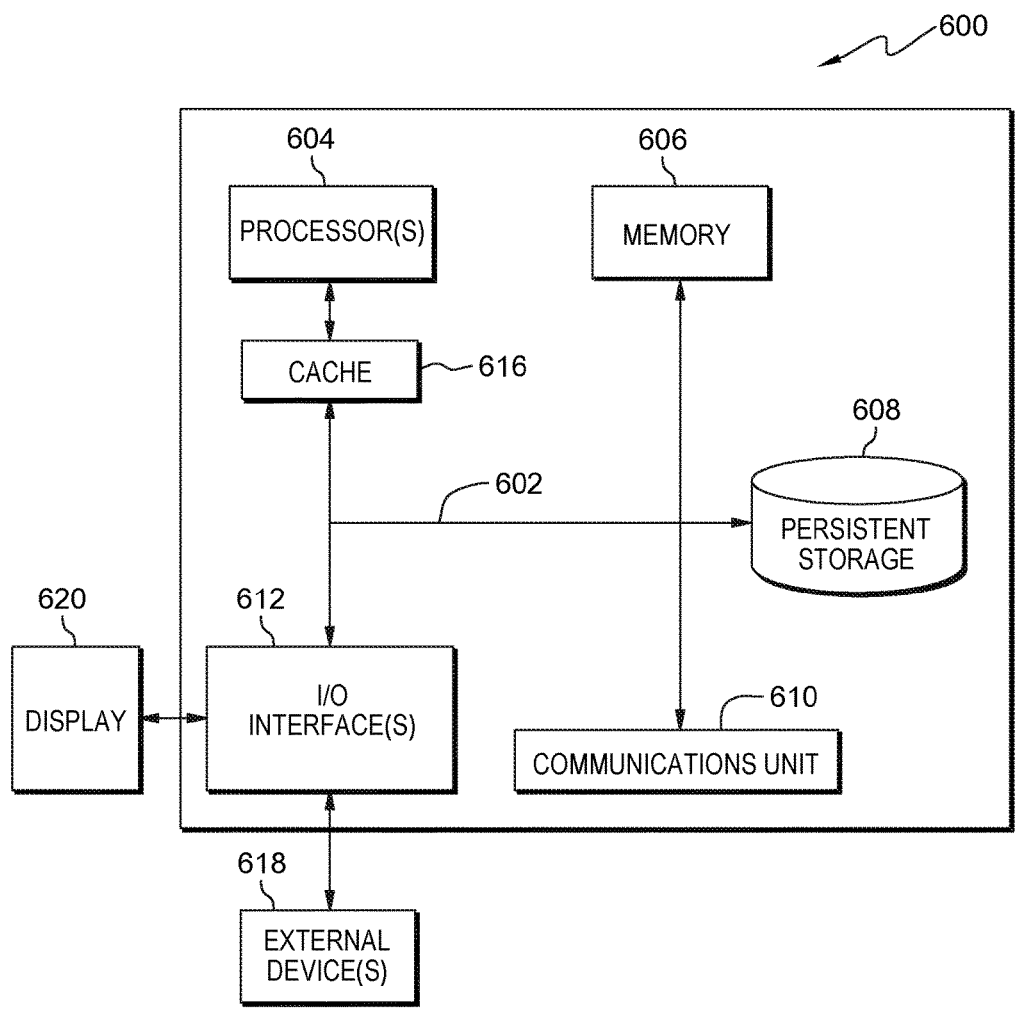
FIG. 6 depicts a block diagram of components of the server, in accordance with one embodiment of the present invention.

FIG. 6 depicts a block diagram 600 of components of server 20 in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Server 20 includes communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Source program 110, IDE 120, dynamic instrumentation function 130, and remove instrumentation function 140 may be stored in persistent storage 608 and in memory 606 for execution by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Source program 110, IDE 120, dynamic instrumentation function 130, and remove instrumentation function 140 may be downloaded to persistent storage 608 through communications unit 610.

I/O interface(s) 612 allows for input and output of data with other devices that may be connected to server computer 102. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., source program 110, IDE 120, dynamic instrumentation function 130, and remove instrumentation function 140, can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for dynamically instrumenting a program at runtime, the method comprising:
    identifying, by a processor, a sequence of memory related operations from an instruction stream, wherein the sequence comprises: a plurality of memory related operations that each reference a first address in memory, including a first memory related operation and a second memory related operation, wherein the second memory related operation is only able to execute subsequent to the first memory related operation;
    instrumenting, by the processor, the first memory related operation;
    detecting, by the processor, an error at the first memory related operation based on the instrumentation of the first memory related operation;
    responsive to detecting the error at the first memory related operation, instrumenting, by the processor, at least the second memory related operation based on the presence of the second memory related operation within the identified sequence.

2. The method of claim 1, wherein instrumenting, by the processor, the first memory related operation comprises:
    instrumenting, by the processor, the first memory related operation with a branch out instruction to a portion of code capable of:
        detecting an error at the first memory related operation;
        responsive to detecting an error at the first memory related operation, causing additional instrumentation to be applied to at least the second memory related operation;
        performing the first memory related operation; and
        branching out to a subsequent instruction following the first memory related operation within the instruction stream.

3. The method of claim 1, wherein each memory related operation is selected from the group consisting of a load instruction and a store instruction.

4. The method of claim 1, further comprising:
monitoring, by the processor, a state associated with the second memory related operation;
determining, by the processor, that the state associated with the second memory related operation indicates that the second memory related operation has been instrumented;
subsequent to detecting the error at the first memory related operation, detecting, by the processor, that the error is no longer present;
responsive to detecting that the error is no longer present, removing, by the processor, the instrumentation associated with at least the second memory related operation.

5. The method of claim 1, wherein the sequence of memory related operations comprises a sequence of load instructions that load from a single definition, such that no path reaches the second memory related operation without first passing through the first memory related operation.

6. The method of claim 1, wherein the sequence of memory related operations comprises a sequence of store instructions to the first address, wherein the second memory related operation may only occur after the first memory related operation.

7. The method of claim 1, wherein the processor is a reduced instruction set computing (RISC) processor.

8. The method of claim 1, wherein each memory related operation of the sequence comprises a same type of memory related operation.

* * * * *